United States Patent [19]

Urai et al.

[11] Patent Number: 4,625,350
[45] Date of Patent: Dec. 2, 1986

[54] SEAT CUSHION WITH WELT

[75] Inventors: Muneharu Urai; Tadafumi Abe, both of Tokyo, Japan

[73] Assignee: Tachikawa Spring Co. Ltd., Japan

[21] Appl. No.: 676,488

[22] Filed: Nov. 29, 1984

Related U.S. Application Data

[60] Division of Ser. No. 651,266, Sep. 17, 1984, which is a continuation of Ser. No. 327,239, Dec. 3, 1981, abandoned.

[30] Foreign Application Priority Data

| Feb. 10, 1981 | [JP] | Japan | 56-17402[U] |
| Mar. 5, 1981 | [JP] | Japan | 56-29600 |
| Apr. 7, 1981 | [JP] | Japan | 56-51113 |

[51] Int. Cl.[4] ............................................. A47C 31/00
[52] U.S. Cl. .......................................... 5/448; 5/407; 5/474; 24/90 A; 24/90 HA; 297/452; 156/155; 156/272.2; 156/297
[58] Field of Search ............... 5/448, 474, 481, 402, 5/406, 407, 470, 471; 297/452; 24/90 A, 90 B, 113 MP, 113 R, 90 HA

[56] References Cited

U.S. PATENT DOCUMENTS

| 2,096,008 | 10/1937 | Schemmel | 5/474 |
| 3,010,866 | 11/1961 | Douchet | 5/481 |
| 3,075,862 | 1/1963 | Hoyer | 5/402 |
| 3,107,190 | 10/1963 | Kevelin | 156/219 |
| 3,451,075 | 6/1969 | Woodard | 5/474 |

FOREIGN PATENT DOCUMENTS

| 715399 | 11/1941 | Fed. Rep. of Germany | 5/474 |
| 2405339 | 8/1975 | Fed. Rep. of Germany | 24/90 B |
| 490132 | 8/1938 | United Kingdom | 5/474 |

*Primary Examiner*—Alexander Grosz
*Attorney, Agent, or Firm*—Oldham, Oldham & Weber Co.

[57] ABSTRACT

A decorative member such as a welt or a button attached to a surface layer of a seat cushion, and a method and apparatus for forming such a decorative member are disclosed. In the method and apparatus, an upper plate is disposed for vertical movement relative to a lower plate, and a pair of holding members defining an insertion space between their upper end portions are vertically or horizontally movably mounted on the lower plate. A covering and a core providing the decorative member are inserted in the insertion space, and a seat cushion is placed between the upper and lower plates with its surface layer facing the holding members. The upper plate is urged downward toward the lower plate to compress the seat cushion onto the holding members while, at the same time, enclosing the core in the covering in the cooperation with the holding members. High frequency current is supplied to complete the decorative member and to weld it to the surface layer of the seat cushion.

2 Claims, 21 Drawing Figures

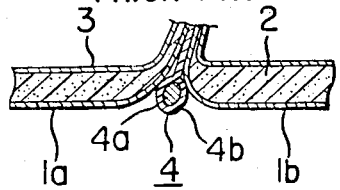
FIG. 1
PRIOR ART
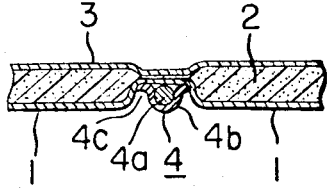
FIG. 2
PRIOR ART
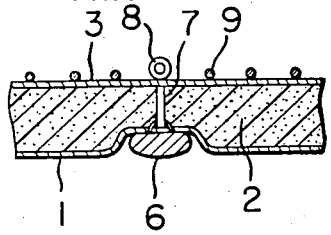
FIG. 3
PRIOR ART
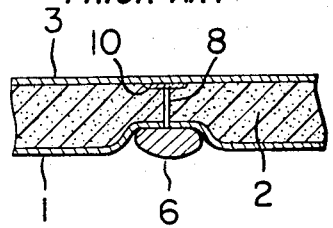
FIG. 4
PRIOR ART
FIG. 5
FIG. 6
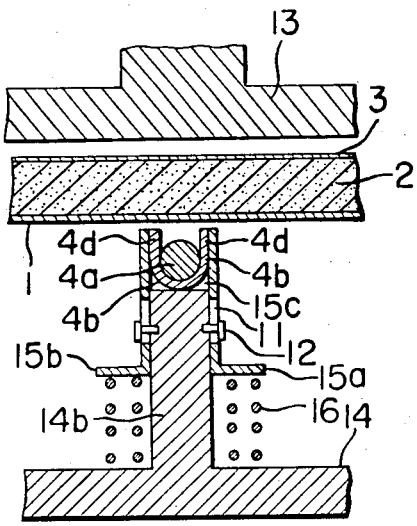
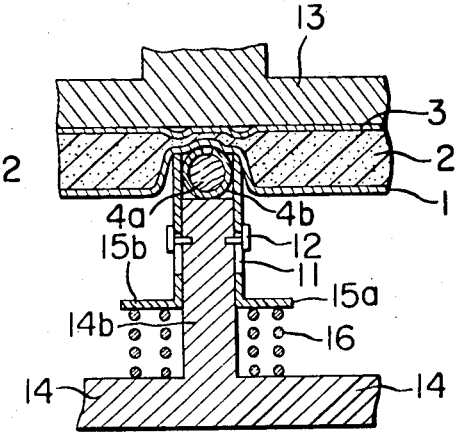
FIG. 7
FIG. 8
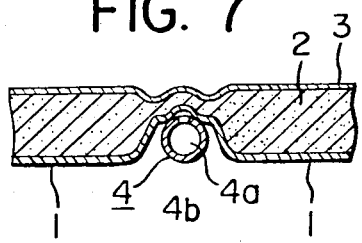
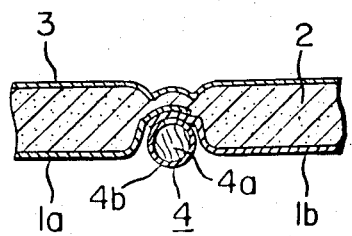

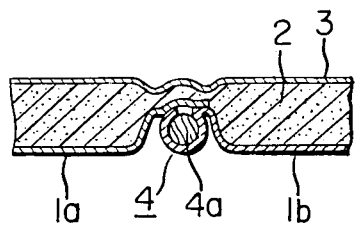
FIG. 9
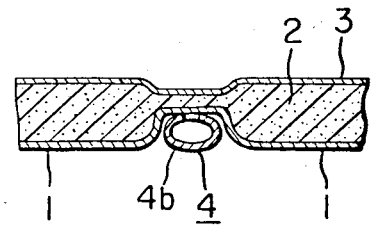
FIG. 10
FIG. 11
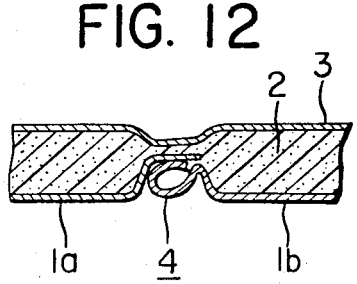
FIG. 12
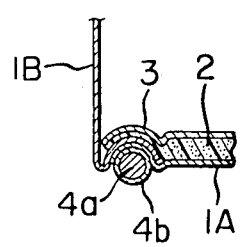
FIG. 13
FIG. 14
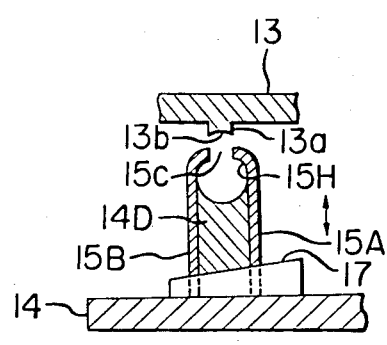
FIG. 15
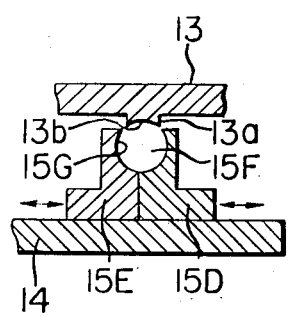
FIG. 16 ature and is fixed at the other end to an anchoring
SEAT CUSHION WITH WELT

CROSS REFERENCE

This is a divisional application of application Ser. No. 651,266, filed Sept. 17, 1984 which is a continuation of Ser. No. 327,239, now abandoned.

BACKGROUND OF THE INVENTION

This invention relates to decorative members of simple structure such a beads, welts or buttons welded under heat to the surface layer of a seat cushion. The present invention relates also to a method and apparatus for forming such welts or buttons.

Welts and buttons are frequently disposed on the seam portions of the surface layer of, for example, a seat cushion, so as to serve the purposes of reinforcement and accent or decoration.

FIGS. 1 and 2 show prior art examples of welts provided on the surface layer of a seat cushion. Referring to FIGS. 1 and 2, reference numerals 1, 1a and 1b designate surface layers of, for example, woven or non-woven fabric material, 2 designate filler pads of, for example, thin foamed polyurethane, and 3 designate backing layers. In FIGS. 1 and 2, the surface layers 1, 1a and 1b are shown disposed lowermost in view of the method welding which will be described later. A welt 4 shown in each of FIGS. 1 and 2 is composed of a core 4a and a covering 4b.

Referring to FIG. 1, the welt 4 (available in the market) is interposed between one surface layer 1a and the other surface layer 1b, and fixed in the seam between the layers 1a and 1b. Referring to FIG. 2, the core 4a is placed on the surface layer 1, and, after covering the core 4a with the covering 4b, the covering 4b is pressed onto the core 4a under application of heat as by high frequency heating to weld the welt 4 to the surface layer 1.

In the case of the prior art welt 4 shown in FIG. 1, the opposite ends of the covering 4b are overlapped and then sewn together, resulting in a large seam thickness. Further, the back end of the welt 4 protrudes considerably beyond the backing layer 3. Therefore, the prior art welt 4 shown in FIG. 1 has been defective in that it does not provide the feeling of comfortable sit when used in a seat cushion and, also, the protruding back end gives rise to an unsatisfactory finish when used in a seat cushion. The prior art welt 4 shown in FIG. 2 has also been defective in that exposure of excess portions 4c of the covering 4b on opposite sides of the welt 4 gives a non-beautiful external appearance.

FIGS. 3 and 4 show prior art examples of decorative buttons used as articles of accent on, for example, a seat cushion. Referring to FIG. 3, a seat cushion is composed of a stack of a surface layer 1 of, for example, woven or non-woven fabric material, a filled pad 2 of, for example, foamed polyurethane, a backing layer 3, and a plurality of wires 9 of spring steel disposed in contact with the backing layer 3. The backing layer 3 and spring wires 9 may not be provided depending on the type of seat cushions. A strip of suspension cloth 8 fixed at one end to a button 6 is passed through a slit 7 of the filler pad 2 and is pulled from the side of the backing layer 3 to form a recess in the surface of the surface layer 1, and the other end is then fixed to one of the spring wires 9 or any other suitable member.

In another prior art example shown in FIG. 4, a strip of suspension cloth 8 fixed at one end to a button 6 is pulled from the side of a backing layer 3 backing a filler pad 2 and is then fixed at the other end to an anchoring member 10 disposed between the filler pad 2 and the backing layer 3. Further, although not illustrated, there is a hook-and-eye combination in which a hook is pressed into an eye formed in a button.

It will thus be seen that the prior art buttons adapted to be attached to the surface layer of a seat cushion have been defective in that a plurality of individual buttons must be manually formed one after another, resulting in considerable man-hours leading to an undesirable increase in the costs. The prior art buttons have also been defective in that the otherwise beautiful appearance of a seat cushion is lost due to frequent come-off of one or more of the buttons, and repair of the seat cushion by reattachment of lost buttons will sometimes be quite difficult.

SUMMARY OF THE INVENTION

The present invention contemplates to obviate all of the defects of the prior art accessory articles or parts pointed out above.

It is a first object of the present invention to provide a method of attaching a decorative member such as a welt or a button to a surface layer of a seat cushion, comprising the steps of providing a pair of holding members on a lower plate of a manufacturing apparatus, said holding means defining an insertion space therebetween, inserting in the insertion space between said holding members a covering forming the surface of the decorative member, disposing the seat-cushion surface layer between an upper plate of the manufacturing apparatus and said lower plate in such a relation that the front side of the seat-cushion surface layer faces said lower plate, and causing relative movement of said upper and lower plates toward each other to compress the end or peripheral portions of said decorative-member surface covering by said holding members thereby forming said decorative member and welding the same to said seat-cushion surface layer.

A second object of the present invention is to provide a decorative member such as a welt or a button formed on and welded to a surface layer of a seat cushion by heating means, said decorative member comprising a covering rounded to enclose a core and welded to said seat-cushion surface layer in such a relation that its end or peripheral portions are completely concealed.

A third object of the present invention is to provide an apparatus for manufacturing, by heating with high frequency current, a weld or a button formed on and welded to a surface layer of a seat cushion, said apparatus comprising an upper plate and a lower plate defining therebetween a space in which the seat-cushion surface layer to be formed with a welt or a button welded thereto is placed, holding means provided on said lower plate to receive in an upper portion thereof a welt covering or a button covering and a welt core or a button core, means for causing upward or downward movement of one of said upper plate and said lower plate relative to the other to compress said welt covering or said button covering onto said welt core or said button core, and means for supplying high frequency current across said upper plate and said holding means to partly melt said welt covering or said button covering and said welt core or said button core by high frequency induction heating, said holding means acting to enclose said welt core or said button core in said welt covering or said button covering and welding the assembly to said seat-cushion surface layer.

BRIEF DISCRIPTION OF THE DRAWINGS

Preferred embodiments of the present invention will now be described in detail with reference to the accompanying drawings, in which:

FIG. 1 is a schematic sectional view of a seat cushion provided with a prior art welt;

FIG. 2 is a schematic sectional view of a seat cushion provided with another prior art welt;

FIG. 3 is a schematic sectional view of a seat cushion provided with a prior art button;

FIG. 4 is a schematic sectional view of a seat cushion provided with another prior art button;

FIGS. 5 and 6 are schematic sectional views of part of a first embodiment of the apparatus for forming under heat a welt according to the present invention, the apparatus being shown in different operative positions;

FIGS. 7 to 14 are schematic sectional views of seat cushions formed with various forms of the welts by the apparatus shown in FIGS. 5 and 6;

FIG. 15 is a schematic sectional view of part of a second embodiment of the apparatus according to the present invention;

FIG. 16 is a schematic sectional view of part of a third embodiment of the apparatus according to the present invention;

DESCRIPTION OF THE PREFERRED EMBODIMENTS

Figure 17:
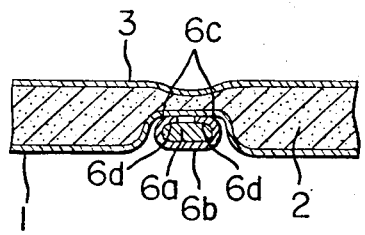
FIG. 17 is a schematic sectional view of a seat cushion formed with the button according to the present invention.

An embodiment of the apparatus and method for forming under heat a welt on the surface layer of a seat cushion according to the present invention will now be briefly described with reference to FIGS. 5 and 6. In FIGS. 5 and 6, the same reference numerals are used to designate the same parts appearing in FIGS. 1 and 2.

Referring now to FIGS. 5 and 6, the apparatus includes an upper plate 13 and a lower plate 14 of a high frequency heater. The lower plate 14 includes an elongate pressure applying member 14b of rectangular cross section extending toward the upper plate 13 and having a length substantially equal to that of the welt 4. A pair of holding members 15a and 15b of L-shaped cross section having a length substantially equal to that of the welt 4 are mounted in symmetrical relation on the opposite side faces of an upper portion of the pressure applying member 14b by means of pins 12 inserted into slots 11 formed in the member 14b, so that the holding members 15a and 15b are vertically movable by being guided by the pin-slot arrangement. Springs 16 are compressed between the lower plate 14 and the lower ends of the holding member 15a, 15b, and a space 15c is defined between the holding members 15a and 15b mounted on the upper portion of the pressure applying member 14.

Prior to the formation of the welt 4 under heat, the covering 4b of the welt 4 is inserted in the form of a U in the space 15c, and, then, the core 4a of the welt 4 is placed in the U-shaped covering 4b. Subsequently, the backing layer 3, the filler pad 2 and the surface layer 1 are disposed in the above order between the upper plate 13 and the upper ends of the holding members 15a, 15b, with the backing layer 3 positioned closest to the upper plate 13.

Then, when the upper plate 13 is urged downward toward the lower plate 14 as shown in FIG. 6, the holding members 15a and 15b are also urged downward against the force of the springs 16, and the end portions 4d of the covering 4b are also compressed by the compression force imparted from above. As the height of the space 15c is gradually lowered, the end portions 4d of the covering 4b are gradually bent to gradually enclose the exposed portion of the core 4a. When the end portions 4d of the covering 4b are completely bent to completely enclose the core 4a as shown in FIG. 6 with further downward movement of the upper plate 13 and holding members 15a, 15b, a high frequency current is supplied across the upper plate 13 and the upper ends of the holding members 15a, 15b to weld the welt 4 to the seat cushion composed of the layers 1, 2 and 3 which are also welded together. The holding members 15a and 15b are urged downward in a double action mode, since they are supported by the springs 16 which act as buffer means. Therefore, the covering 4b can be satisfactorily wrapped around the core 4a without the probability of occurrence of thinning or severing at the welded area. The surface layer 1, filler pad 2 and backing layer 3 engaging the upper ends of the holding members 15a and 15b are welded together over a width greater than the distance between the upper ends of the holding members 15a and 15b to ensure that the end portions 4d of the covering 4b are completely welded to the surface layer 1 of the seat cushion. Although the upper end of the pressure applying member 14b is shown in the form of a flat surface, it may be in the form of an arcuate concave surface.

FIG. 7 shows a first form of the welt 4 thus completed on the surface layer 1 of the seat cushion.

FIG. 8 shows a second form of the welt 4. In FIG. 8, a surface layer 1a is overlapped at one end with the corresponding end of another surface layer 1b which may be different in material, color or pattern from the former or which may be the same in material as the former, and the core 4a is similarly enclosed in the covering 4b to form the welt 4 at the overlapped end portions of the surface layers 1a and 1b by welding under heat.

FIG. 9 shows a third form of the welt 4. In FIG. 9, the covering 4b is not used, and, in lieu of the covering 4b, the core 4a is enclosed by one end portion of a surface layer 1b to form the welt 4 by welding under heat.

FIG. 10 shows a fourth form of the welt 4. In FIG. 10, the core 4a shown in FIG. 7 is not used, and the covering 4b is rounded into a form analogous to the form of the welt 4. Because of the elimination of the core 4a, the welt 4 locks soft and tender and meets the demand for a flat shape. Although the welt 4 of elliptical cross section is illustrated, the actual shape of the internal space may differ from that illustrated.

FIG. 11 shows a fifth form of the welt 4. In FIG. 11, the covering 4b has a width greater than that shown in FIG. 10 and is rounded into a double or triple layer structure. Such a covering 4b is welded to the surface layer 1 under heat without the use of the core 4a.

FIG. 12 shows a sixth form of the welt 4. In FIG. 12, the core 4a used in the welt 4 shown in FIG. 9 is eliminated, and the end portion of the surface layer 1b is substantially rounded to form the welt 4. This end portion may be rounded into a double or triple layer structure as described with reference to FIG. 11.

FIG. 13 shows a seventh form of the welt 4. In FIG. 13, the left-hand members shown in FIG. 8 are replaced by a single surface layer 1B which provides a peripheral portion of the seat cushion. Referring to FIG. 13, the covering 4b and core 4a of the welt 4 are welded under heat to another surface layer 1A which provides the main top portion of the seat cushion. In FIG. 13, the surface layer 1B is illustrated in a form bent at right angles with respect to the surface layer 1A by way of example. This is because, in the actual seat cushion configuration, the surface of the surface layer 1 does not always include a straight portion but includes a curved or bent portion.

FIG. 14 shows an eighth form of the welt 4. In FIG. 14, the covering 4b has a large width, and a portion thereof is rounded to overlap another portion covering the core 4a.

FIG. 15 shows a second embodiment or a modification of the welding apparatus according to the present invention, which is designed to form a completely rounded welt 4 like that shown in FIG. 11 on 14. Referring to FIG. 15, a projection 13a having an arcuate recess 13b at its lower end extends downward from the upper plate 13 of the manufacturing apparatus. A pair of elongate holding members 15A and 15B are fixed at their lower ends to the upper surface of the lower plate 14, and their upper end portions are curved at the confronting inner surface portions as indicated by 15H. Slots are bored in the lower portions of the holding members 15A and 15B to permit sliding movement of a plurality of wedges 17 therethrough in a direction orthogonal with respect to the direction of movement of the upper plate 13. The pressure applying member 14D is not fixed to the lower plate 14 but is vertically movably interposed between the holding members 15A and 15B, and the vertical movement of the pressure applying member 14d of the length equal to that of the holding members 15A, 15B caused by the sliding movement of the wedges 17. The pressure applying member 14b has an arcuate recess at its upper end to define a channel 15C of circular cross section together with the curved upper end portions of the holding members 15A and 15B.

The core 4a and covering 4b of the welt 4 and the layers composing the seat cushion are placed in a manner similar to that described with reference to FIGS. 5 and 6. In the welding process, the upper plate 13 is urged downward with the progress of heating, and, at the same time, the plural wedges 17 are moved leftward in FIG. 15 to urge the pressure applying member 14b with their upper tapered surfaces, thereby welding the completely rounded welt 4 to the surface layer 1 of the seat cushion.

Although the wedges 17 are illustrated in FIG. 15 by way of example, any other suitable mechanism such as a cam mechanism or a rack-pinion combination may be exployed in lieu of the wedges 17.

FIG. 16 shows a third embodiment or a modification of the welding apparatus shown in FIG. 15. Referring to FIG. 16, a pair or elongate holding members 15D and 15E of generally L-like cross section are disposed on the lower plate 14 so as to be slidable in the directions of the arrows in a symmetrical relation. The upper end portions of these holding members 15D and 15E are curved at the confronting inner surface portions as indicated by 15G, so as to define a channel 15F or circular cross section when the members 15D and 15E are mated.

The steps of forming the welt 4 are similar to those described with reference to FIG. 15, and any detailed description thereof will be unnecessary.

When the materials of the surface layer, welt covering and filler pad have different melting points, application of heat for melting the material having a higher welding temperature in the process of welding will result in an excessive melting of the surface of the material having a lower welding temperature, and deterioration of the quality of the seat cushion will result. In such a case, the surface of the material having the lower welding temperature is preferably cooled by gas such as air to prevent deterioration of the quality of the seat cushion.

Also, when a material which is not welded under heat is employed, another material which is readily molten under heat may be interposed between it and the adjoining layer.

The material of the filler pad is in no way limited to polyurethane of various kinds and may be any other suitable one such as a fibrous or fabric material.

FIG. 17 shows application of the present invention to the formation of a button on, for example, a seat cushion.

Referring to FIG. 17, a seat cushion is composed of a surface layer 1, a filler pad 2 of cushion material such as foamed polyurethane and a backing layer 3. Reference numeral 6a designates a button core made of a suitable material such as wood or synthetic resin. Although the core 6a is generally circular in cross section, it may be elliptical, square or polygonal in cross section depending on the shape of the button to be formed. The button core 6a is covered with a button covering 6b. This covering 6b is suitably molten by heating means together with the surface layer 1 of the seat cushion under application of pressure by a manufacturing apparatus which will be described later. The peripheral portions 6d of the covering 6b are compressed to enclose the core 6a, and, at the same time, the covering 6b is welded at weld areas 6c to the surface layer 1 of the seat cushion.

The material of the button covering 6b may be the same as that of the surface layer 1 of the seat cushion, or the color of the former may differ from that of the latter when the material is the same. The material of the covering 6b may differ from that of the seat-cushion surface layer 1, provided that it is fusible under heat. The material of the covering 6b may be non-fusible when the material of the seat cushion surface layer 1 is fusible under heat.

The button core 6a is preferably heat resistive when it is made of a synthetic resin. A synthetic resin, whose surface is more or less molten by the heat applied from the heating means, can be used as the material of the core 6a since it is satisfactorily welded to the covering 6b. Although a single button is shown in FIG. 17, a plurality of such buttons can be simultaneously formed on the seat-cushion surface layer 1 by the provision of a plurality of pairs of holding means in a manufacturing apparatus which will be described presently.

A plurality of forms of such an apparatus will now be described with reference to FIGS. 18 to 21.

Figure 18:
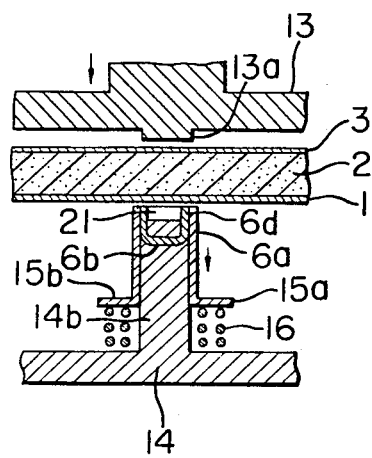
FIG. 18 is a schematic sectional view of part of a fourth embodiment of the apparatus for forming the button under heat according to the present invention.

Referring to FIG. 18, an embodiment of the high frequency welding apparatus includes an upper plate 13 provided at its lower surface with a projection 13a sized to conform to the external shape of the formed button, and al lower plate 14 having a plurality of button receiving members 14b extending therefrom. The upper end of each of these members 14b is formed with a recess shaped to conform to the surface contour of the formed button so that the shape of the upper end meets the shape (circular, elliptical or like shape) of the button. A pair of part-cylindrical holding members 15a and 15b each having a flanged lower end are mounted on the upper portion of each of the button receiving members 14b and are urged by springs 16 at the flanged ends so that they are vertically slidable. A space 21 is defined between the upper end of the button receiving member 14b and the upper ends of the associated holding members 15a and 15b. A plurality of sets each composed of the button receiving member 14b and the associated holding members 15a, 15b are thus provided on the lower plate 14 by the number corresponding to that of the buttons to be formed. The shape of the upper end of the button receiving member 14b and the shape of the upper ends of the holding members 15a, 15b differ depending on the external contour of the button to be formed.

In the first step, the surface layer 1 to which the buttons are welded, the filler pad 2 and the backing layer 3 are placed, in the above order and with the surface layer 1 located lowermost, between the upper plate 13 and the upper ends of the holding members 15a and 15b. Then, the button covering 6b and button core 6a cut into a suitable size and shape are inserted into each of the spaces 21 defined above the holding menbers 15a and 15b. A sheet such as an insulating sheet (not shown) is interposed between the upper plate 13 and the backing layer 3.

Figure 21:
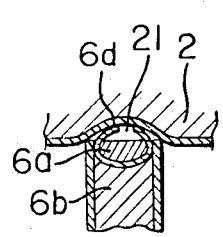
FIG. 21 is a partial view illustrating the operation of the embodiment shown in FIG. 18.

For the purpose of formation and welding of the buttons, the upper plate 13 is urged downward toward the lower plate 14. With the downward movement of the upper plate 13, the holding members 15a and 15b are also urged downward to compress the peripheral portions 6d of each of the button covering 6b. As the height of the space 21 is gradually reduced (the depth of the space 21 is shallowed) as seen in FIG. 21, the peripheral portions 6d of the covering 6b are gradually bent to enclose the core 6a. In this case, the upper inner end walls of the holding members 15a and 15b may be slightly inclined inward so as to facilitate the enclosure of the core 6a in the covering 6b, although not shown.

The upper plate 13 is further urged downward together with the holding members 15a and 15b beyond the position shown in FIG. 21 until the core 6a is completely enclosed in the covering 6b. At this moment, high frequency current is supplied across the upper plate 13 and the upper ends of the holding members 15a and 15b weld the button coverings 6b to the seat-cushion surface layer 1 and, at the same time, to weld the filler pad 2 and backing layer 3 to the surface layer 1 by heat produced by the current. Then, the upper plate 13 is urged upward away from the lower plate 14, and the product is taken out. The apparatus is now ready for the next welding.

Figure 19:
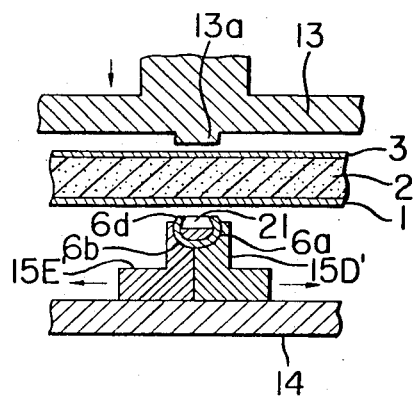
FIG. 19 is a schematic sectional view of part of a fifth embodiment of the apparatus according to the present invention.

FIG. 19 shows a modification of the manufacturing apparatus shown in FIG. 18. Referring to FIG. 19, the member 14b is vertically split into a pair of holding members 15D' and 15E' defining between their upper ends a plurality of concave or spaces or cavities 21 into each of which the button core 6a and covering 6b are inserted. There holding members 15D' and 15E' are arranged to be horizontally movable toward and away from each other in a symmetrical relation. In this embodiment, the upper portion of each of the spaces or cavities 21 is curved inward so that the core 6a can be easily enclosed in the covering 6b.

In the first step, the holding members 15D' and 15E' are joined, and the button covering 6b and core 6a are inserted into each of the spaces or cavities 21. The succeeding steps are substantially similar to those described with reference to FIG. 18. Upon completion of welding, the holding members 15D' and 15E' are moved away from each other, and the product is taken out.

Figure 20:
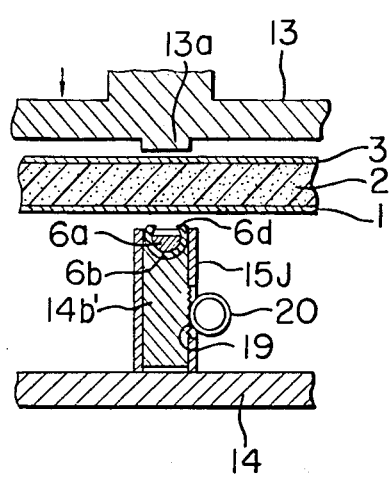
FIG. 20 is a schematic sectional view of part of a sixth embodiment of the apparatus according to the present invention.

In another modification shown in FIG. 20, a plurality of cylindrical holding members 15J are fixed to the lower plate 14, and a button receiving member 14b' having a recess at its upper end is vertically movably disposed in each of the holding members 15J. In the illustrated form, a rack 19 formed on each of the button receiving members 14b' makes meshing engagement with an associated pinion 20 to cause vertical movement of the button receiving member 14b'. In another form, a cam may be disposed beneath the lower end of each of the button receiving members 14b' or a tapered wedge may be provided to cause vertical movement of each of the member 14b'. When a plurality of holding members 15J are provided as above described, the pinions 20 or cams must be disposed in coaxial relation so that the button receiving members 14b' can be simultaneously moved in the vertical direction.

The steps of formation and welding of the buttons are similar to those described with reference to FIG. 18, except that the button receiving members 14b' are urged upward during enclosure of the button core 6a in the covering 6b and during welding of the covering 6b to the seat-cushion surface layer 1. Therefore, any detailed description will be unnecessary.

When the material of the seat-cushion surface layer 1 or button covering agent such as powdery nylon may be impregnated or a nylon film may be interposed therebetween to ensure welding of the covering 6b to the seat-cushion surface layer 1.

The high frequency heating is not in any way the sole means for heating, and ultrasonic heating or another heating means such as an electric heater may be employed for the purpose of heating.

When the materials of the surface layer 1, filler pad 2, button covering 6b and button core 6a have different melting points, application of heat for melting the material having a higher welding temperature in the process of welding will result in an excessive melting of the surface of the material having a lower welding temperature, and deterioration of the quality of the seat cushion will result. In such a case, the surface of the material having the lower welding temperature is preferably cooled by gas such as air to prevent deterioration of the quality of the seat cushion.

It will be understood from the foregoing detailed description of the buttons formed by welding and the manufacturing apparatus therefor according to the present invention that the required number of buttons can be simultaneously formed and welded to the surface layer of the seat cushion. The buttons of the same shape can be provided in equally spaced apart relation, and the greatly reduced number of manufacturing steps reduces the costs greatly. The manufacturing apparatus according to the present invention is simple in construction, and even an unskilled operator can easily handle the apparatus. Thus, the seat cushions formed with the decorative buttons can be efficiently produced at low costs.

What is claimed is:

1. A welt formed on and welded to a surface layer of a seat cushion by heating means, said welt comprising a core of required length and an elongate covering of a circumferential length substantially the same as the circumference of said core, said covering being rounded to enclose said core and being welded to said seat-cushion surface layer, said seat-cushion surface layer including one surface layer and another surface layer, and an end portion of said one surface layer overlaps an associated end portion of said another surface layer, and said welt is formed on and welded to said end portion of said another surface layer, and wherein an end portion of said one surface layer defines said covering that encloses said core and is welded to the end portion of the other surface layer.

2. The structure of claim 1, wherein the core is not a solid element.

* * * * *